US011331806B2

(12) United States Patent
Lin et al.

(10) Patent No.: US 11,331,806 B2
(45) Date of Patent: May 17, 2022

(54) ROBOT CONTROL METHOD AND APPARATUS AND ROBOT USING THE SAME

(71) Applicant: UBTECH ROBOTICS CORP LTD, Shenzhen (CN)

(72) Inventors: Zecai Lin, Shenzhen (CN); Miaochen Guo, Shenzhen (CN); Yizhang Liu, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 198 days.

(21) Appl. No.: 16/843,921

(22) Filed: Apr. 9, 2020

(65) Prior Publication Data
US 2021/0197384 A1 Jul. 1, 2021

(30) Foreign Application Priority Data

Dec. 26, 2019 (CN) .......................... 201911365377.6

(51) Int. Cl.
*G05B 19/42* (2006.01)
*B25J 9/16* (2006.01)
(Continued)

(52) U.S. Cl.
CPC ........... *B25J 9/1679* (2013.01); *B25J 9/0009* (2013.01); *B25J 9/04* (2013.01); *B25J 9/06* (2013.01);
(Continued)

(58) Field of Classification Search
CPC .................... B25J 13/088; B25J 19/04; G05B 2219/36184; G05B 2219/40264; G05B 2219/40391
See application file for complete search history.

(56) References Cited

U.S. PATENT DOCUMENTS 5,341,078 A * 8/1994 Torii ...................... G05B 19/19
318/568.22
10,807,233 B2 * 10/2020 Dani .................. G06K 9/00335
(Continued)

FOREIGN PATENT DOCUMENTS

CN 110480634 A 11/2019

OTHER PUBLICATIONS

Huang, Ching-Chun, and Manh Hung Nguyen. "Robust 3D skeleton tracking based on openpose and a probabilistic tracking framework." 2019 IEEE International Conference on Systems, Man and Cybernetics (SMC). IEEE, 2019. (Year: 2019).*
(Continued)

*Primary Examiner* — Dale Moyer

(57) ABSTRACT

The present disclosure discloses a robot control method as well as an apparatus, and a robot using the same. The method includes: obtaining a human pose image; obtaining pixel information of key points in the human pose image; obtaining three-dimensional positional information of key points of a human arm according to the pixel information of the preset key points; obtaining a robotic arm kinematics model of a robot; obtaining an angle of each joint in the robotic arm kinematics model according to the three-dimensional positional information of the key points of the human arm and the robotic arm kinematics model; and controlling an arm of the robot to perform a corresponding action according to the angle of each joint. The control method does not require a three-dimensional stereo camera to collect three-dimensional coordinates of a human body, which reduces the cost to a certain extent.

20 Claims, 6 Drawing Sheets

(51) Int. Cl.
*B25J 9/04* (2006.01)
*B25J 9/06* (2006.01)
*B25J 9/00* (2006.01)
*B25J 17/02* (2006.01)
*B25J 13/08* (2006.01)
*B25J 19/04* (2006.01)
*B25J 9/12* (2006.01)

(52) U.S. Cl.
CPC .............. *B25J 9/12* (2013.01); *B25J 9/161* (2013.01); *B25J 9/1607* (2013.01); *B25J 9/1697* (2013.01); *B25J 13/08* (2013.01); *B25J 17/0283* (2013.01); *B25J 19/04* (2013.01)

(56) References Cited

U.S. PATENT DOCUMENTS

| | | | |
|---|---|---|---|
| 2007/0162164 A1* | 7/2007 | Dariush | G06T 7/70 700/61 |
| 2011/0093119 A1* | 4/2011 | Park | B25J 9/1607 700/254 |
| 2020/0178851 A1* | 6/2020 | Singhose | A61B 5/1128 |
| 2021/0122045 A1* | 4/2021 | Handa | B25J 13/084 |
| 2021/0205986 A1* | 7/2021 | Kalouche | B25J 9/1689 |
| 2021/0370506 A1* | 12/2021 | Yamane | G06F 3/0383 |

OTHER PUBLICATIONS

"Overview of human pose estimation methods based on deep learning", Yinong Deng, Jianxin Luo and Fenglin Jin, Computer Engineering and Applications, vol. 55, No. 19, pp. 22-42, Aug. 12, 2019.

* cited by examiner

ROBOT CONTROL METHOD AND APPARATUS AND ROBOT USING THE SAME

CROSS REFERENCE TO RELATED APPLICATIONS

The present disclosure claims priority to Chinese Patent Application No. 201911365377.6, filed Dec. 26, 2019, which is hereby incorporated by reference herein as if set forth in its entirety.

BACKGROUND

1. Technical Field

The present disclosure relates to robot control technology, and particularly to a robot control method as well as an apparatus, and a robot using the same.

2. Description of Related Art

Due to the humanoid robots have high similarity with human bodies in their limbs, the control of the motion of the upper and lower limbs of a humanoid robot can be realized according to the demonstrative motions of a human body. In the existing humanoid robot control technologies, the humanoid motion of the humanoid robot can be realized through the captured motional postures of human body and the human-machine motion mappings. In order to capture the motional postures of the human body, it generally use a three-dimensional (3D) stereo camera such as a binocular 3D stereo camera to collect human motion images and depth information, and then the posture of the humanoid robot can be determined through human-machine motion mappings. However, since the 3D stereo cameras have high price and large size, which are not conducive to install and use on humanoid robots.

BRIEF DESCRIPTION OF THE DRAWINGS

In order to more clearly illustrate the technical solutions in this embodiment disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

Figure 1:
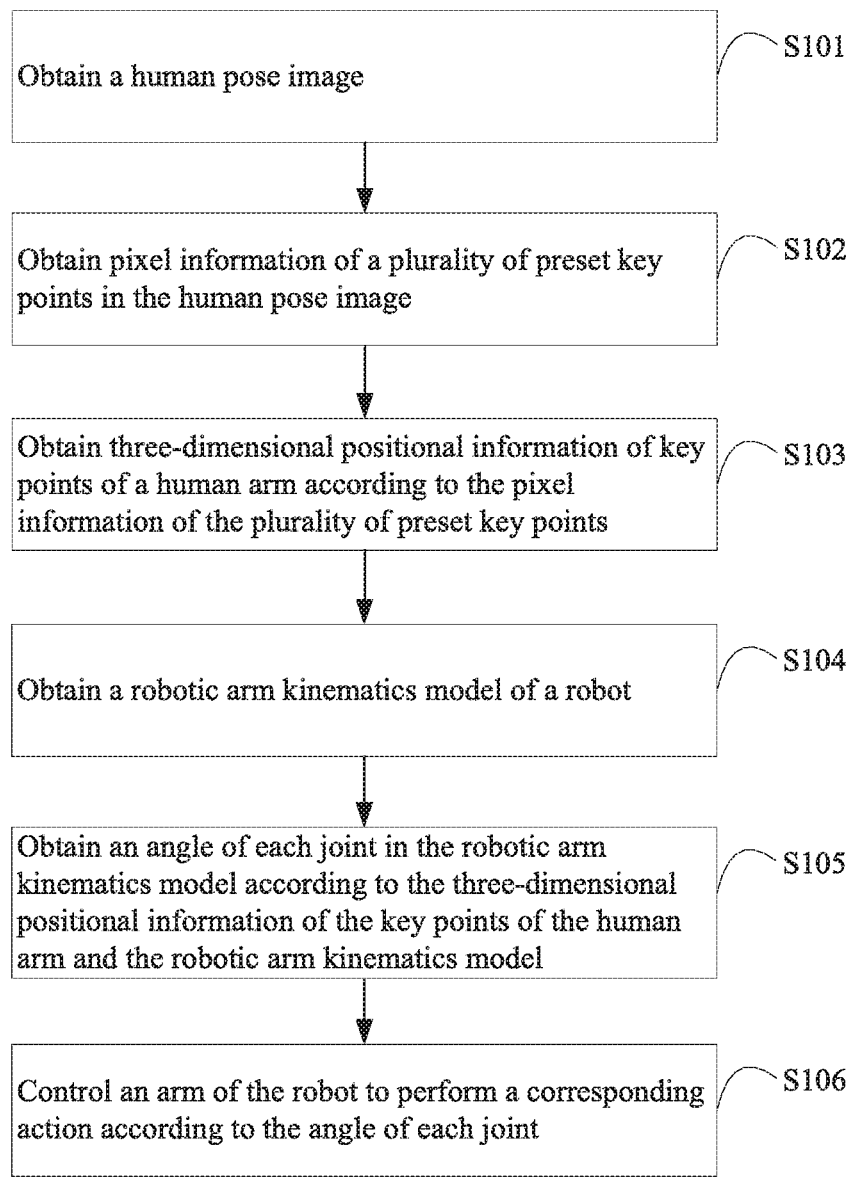
FIG. 1 is a flow chart of a robot control method according to the embodiment one of the present disclosure.

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the descriptions of the specification and the claims of the present disclosure, the terms "first", "second", "third", and the like in the descriptions are only used for distinguishing, and cannot be understood as indicating or implying relative importance.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in some other embodiments", "in other embodiments" and the like that appear in different places of the specification do not mean that descripted embodiments should be referred by all other embodiments, but instead be referred by "one or more but not all other embodiments" unless otherwise specifically emphasized. The terms "including", "comprising", "having" and their variations all mean "including but not limited to" unless otherwise specifically emphasized.

It should be understood that, the sequence of the serial number of the steps in the above-mentioned embodiments does not mean the execution order while the execution order of each process should be determined by its function and internal logic, which should not be taken as any limitation to the implementation process of the embodiments.

For the purpose of describing the technical solutions of the present disclosure, the following describes through specific embodiments.

Figure 5:
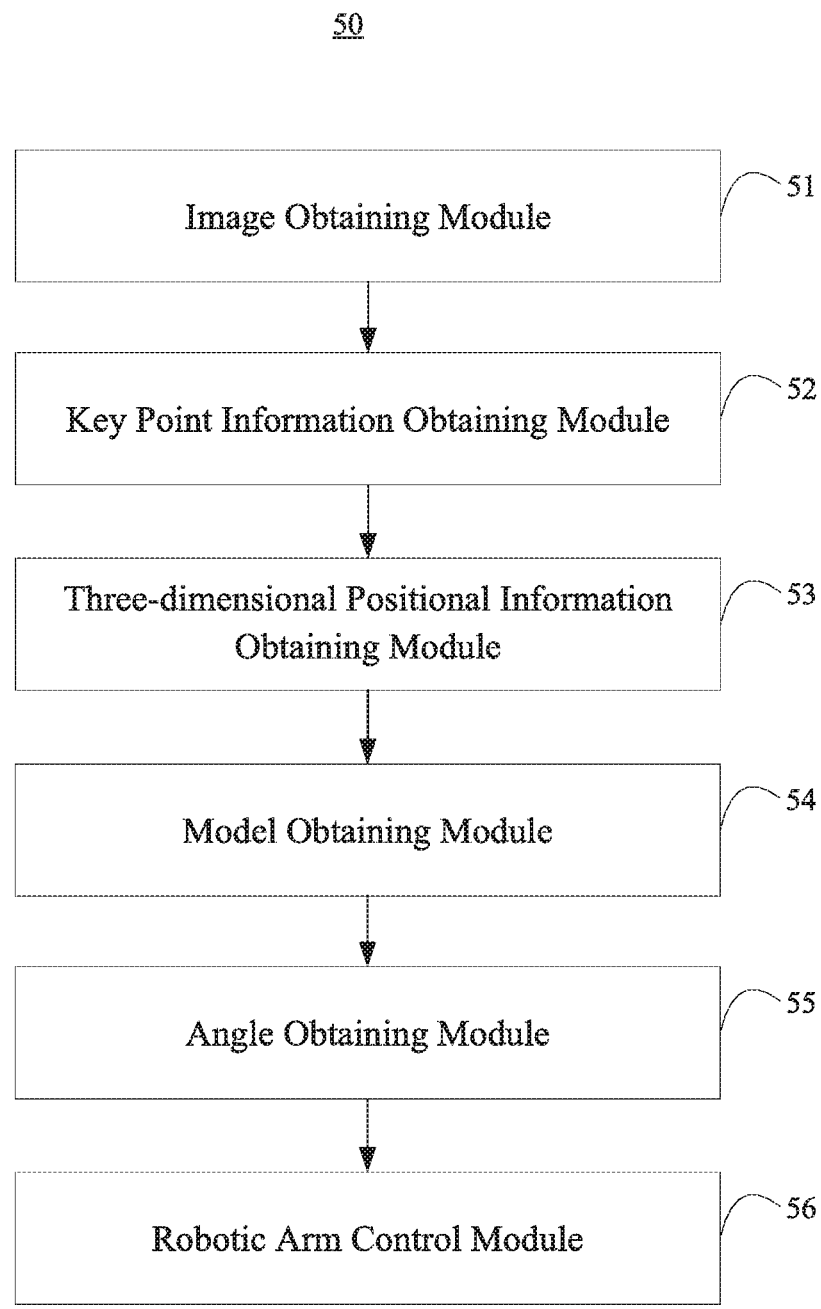
FIG. 5 is a schematic block diagram of a robot control apparatus according to the embodiment two of the present disclosure.
Figure 6:
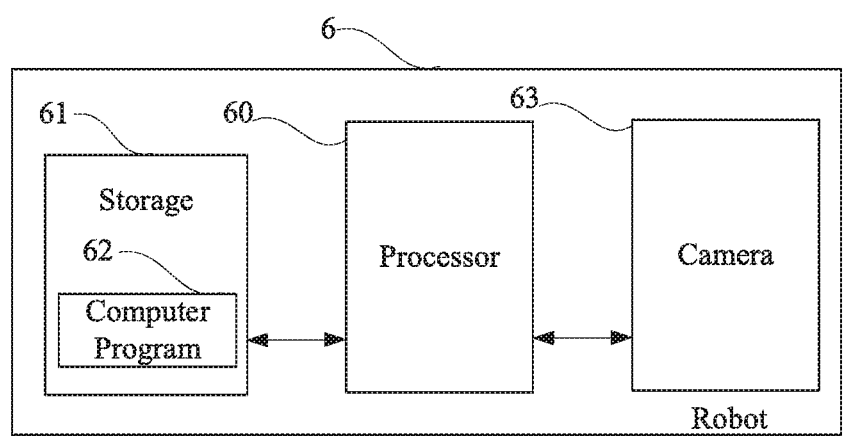
FIG. 6 is a schematic block diagram of a robot according to the embodiment three of the present disclosure.

FIG. 1 is a flow chart of a robot control method according to the embodiment one of the present disclosure. In this embodiment, a robot control method is provided, which can be applied to a humanoid robot while the type of the humanoid robot is not limited herein. The humanoid robot has a left arm and a right arm. The method is a computer-implemented method executable for a processor, which may be implemented through and applied to a robot control apparatus as shown in FIG. 5 or implemented through a robot as shown in FIG. 6. As shown in FIG. 1, the method includes the following steps.

S101: obtaining a human pose image.

In which, the human pose image may refer to a photo that wholly or partly contains a human body part such as a human head, waist, limbs, and the like, which may be a color (RGB) image taken by an ordinary color (RGB) camera, an image taken by a web camera, or the like. The human pose image is a two-dimensional image, where the pixel information contained in the image is two-dimensional pixel information.

S102: obtaining pixel information of a plurality of preset key points in the human pose image.

Figure 2:
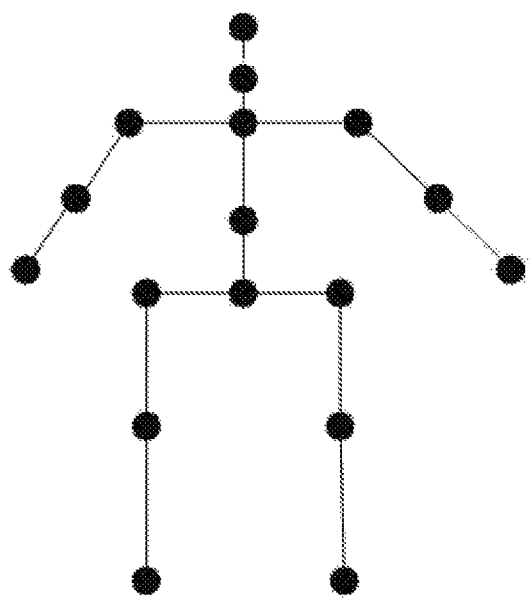
FIG. 2 is a schematic diagram of the selected preset key points according to the embodiment one of the present disclosure.

In which, the preset key point can be determined according to the main body part included in the human posture image, which are points for representing human body parts. For example, a shoulder point is used to indicate a human shoulder, and an elbow point is used to indicate a human elbow. In this embodiment, the human pose image obtained is an image including the entire human body. FIG. 2 is a schematic diagram of the selected preset key points according to the embodiment one of the present disclosure. As shown in FIG. 2, the pixel information of 17 preset key points of the human body is obtained, where 6 of them are on the arm, 6 of them are on the leg, and 5 of them are located from the head to the abdomen.

In one embodiment, the step S102 of obtaining the pixel information of the plurality of preset key points in the human pose image can include:

inputting the human pose image to a light weight open pose (LWOP) detection model to obtain the pixel information of the plurality of preset key points in the human pose image.

In which, the human pose image including the entire human body is input into a light weight open pose detection model to detect the above-mentioned 17 preset key points, and then the pixel information such as the pixel coordinates of the 17 preset key points are provided. The LWOP detection model refers to a model that a lightweight Bottleneck module is used in the downsampling phase of the LWOP detection model, while a light weight form is also selected in the upsampling phase. By adopting the LWOP detection model, the usage of the processor can be reduced, thereby improving the image processing efficiency.

S103: obtaining three-dimensional positional information of key points of a human arm according to the pixel information of the plurality of preset key points.

In which, the key points of the human arm are the preset key points of an area at which the human arm in the human posture image locates. The preset key points of the area at which the human arm in the human posture image locates are a shoulder point, an elbow point, and a wrist point. The key points of the human arm are the shoulder point, the elbow point, and the wrist point of the left arm or the right arm. According to the pixel information of the plurality of preset key points, the three-dimensional positional information of all the key points in the plurality of preset key points can be obtained. In this embodiment, since only the arm of the robot is controlled, only the three-dimensional positional information of the key points of the human arm is obtained.

In one embodiment, the step 103 of obtaining three-dimensional positional information of the key points of the human arm according to the pixel information of the plurality of preset key points includes:

inputting the pixel information of the plurality of preset key points to a convolutional neural network model to obtain the three-dimensional positional information of the key points of the human arm.

In which, the above-mentioned convolutional neural network model has a total of 7 layers, which includes two convolutional layers, two batch regularization (i.e., batchnorm) layers, two fully connected layers, and one input layer. The input data of the input layer is the pixel information of the preset key points. The output layer is a fully connected layer, and the output data is the three-dimensional positional information of the preset key points. For example, in the case that the input data of the input layer is the pixel coordinates of the 17 preset key points, since the pixel coordinates are two-dimensional coordinates, the input data has 34 neurons in total, while the output data is three-dimensional positional information with 51 neurons in total. In addition, the convolutional neural network model adopts a linear rectifier (ReLU) function as the excitation function, and the public human 3.6 m human action database is used to train the convolutional neural network model.

After the step 103 of obtaining the three-dimensional positional information of the key points of the human arm according to the pixel information of the plurality of preset key points, the method further includes:

performing a denoising process on the three-dimensional positional information of the key points of the human arm through a first-order low-pass filter.

In which, the final result of the denoising process of the first-order low-pass filter is:

$$y=kx_t+(1-k)y_{t-1};$$

where, y represents the final result after the filtering, k is a weight and k<1, $x_t$ is the current data input value, and $y_{t-1}$ is the final result of the previous filtering; the greater the difference between $x_t$ and $y_{t-1}$ is, the smaller the value of k is, and by using the first-order low-pass filter, one or two sudden changed data due to noise and the characteristic of convolutional neural networks can be removed, thereby avoiding the impact of data jitters.

S104: obtaining a robotic arm kinematics model of a robot.

When the arm of the robot acts, it needs to rely on the kinematics model of the arm itself. The degree of freedom of the arm determines the actions that the arm can perform. For example, when the arm is set with the degree of freedom for elbow, it can control the corresponding mechanisms of the elbow to perform the flexion and extension motions similar to the human arm.

In one embodiment, the robotic arm kinematics model is an arm model equivalent to a human arm with four degrees of freedom, where a shoulder portion of the arm has three degrees of freedom, and an elbow portion of the arm has one degree of freedom.

Figure 3:
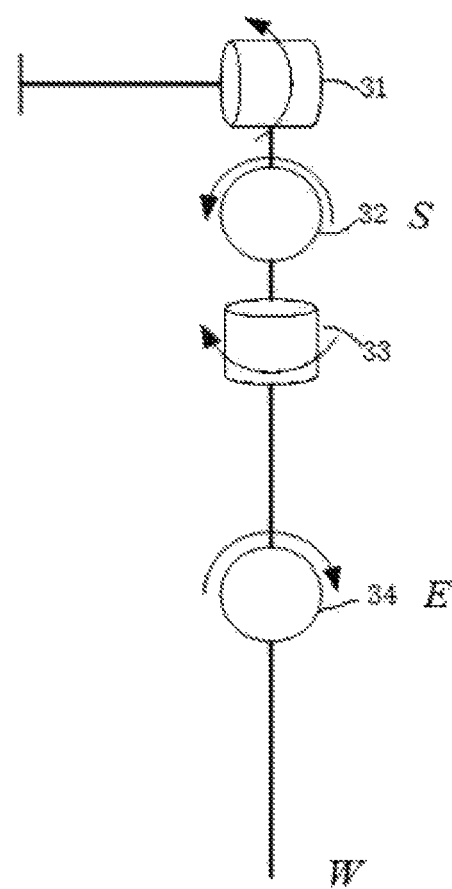
FIG. 3 is a schematic diagram of a robotic arm kinematics model of a robot which is equivalent to a human arm according to the embodiment one of the present disclosure.

FIG. 3 is a schematic diagram of a robotic arm kinematics model of a robot which is equivalent to a human arm according to the embodiment one of the present disclosure. As shown in FIG. 3, S represents a shoulder, E represents an elbow, and W represents a wrist. In which, the shoulder S is provided with three degrees of freedom, which includes a first joint 31, a second joint 32, and a third joint 33. The elbow E is provided with one degree of freedom, which includes a fourth joint 34. The third joint 33 and the fourth joint 34 are connected through a connecting rod. The fourth joint 34 and the wrists are connected through a connecting rod, while the first joint 31, the second joint 32, and the third joint 33 can be connected directly or through a connecting rod. In order to be similar to the human arm, the arm needs to include a upper arm and a lower arm, and the degree of freedom of the first joint 31 is that the upper arm of the arm swings back and forth in a vertical direction, the degree of freedom of the second joint 32 is that the upper arm of the arm swings left and right in a horizontal direction, and the degree of freedom of the third joint 33 is that the upper arm of the arm performs a rotational movement with itself as the axis, and the degree of freedom of the fourth joint 34 is the flexion and extension motions between the upper and lower arms of the arm.

There is a Denavit-Hartenberg (DH) parameter table included in the robotic arm kinematics model, and the parameters in the DH parameter table include the angles of the joints. The DH kinematics modeling is performed based on the DH parameter table to create a transformation matrix $^{i-1}R_i(q_{i-1})$ of the i-th joint with respect to the i−1-th joint, where i represents the i-th joint, and $q_{i-1}$ is the angle of the i-1th joint. By substituting the angle of the i−1-th joint in to $^{i-1}R_i(q_{i-1})$, the determined coordinate system transformation matrix of the i-th joint with respect to the i−1-th joint can be obtained. In the arm, the shoulder S is the 0-th joint, the first joint 31 is the 1-th joint, the second joint 32 is the 2-th joint, the third joint 33 is the 3-th joint, the fourth joint 34 is the 4-th joint, and the wrist W is the 5-th joint. In this embodiment, the coordinate transformation matrix of the 1-th joint with respect to the 0-th joint is $^0R_1=1$, that is, the shoulder S and the first joint 31 of the arm are considered to be at the same position.

The position of the fourth joint 34 is determined by the motion of the first joint 31 and the second joint 32 of the shoulder S. The fourth joint 34 is expressed as $^0R_1{}^1R_2(q_1)$ $^2R_3(q_2){}^3P_E$ in the coordinate system of the shoulder S. In which, $^3P_E=[0, 0, a]^T$ is the three-dimensional coordinate of the fourth joint 34 in the coordinate system of the third joint 32, and a is the length of the connecting rod between the third joint 32 and the fourth joint 34.

The position of the wrist W is determined by the motions of the first joint 31, the second joint 32, and the third joint 33 of the shoulder S as well as the fourth joint 34 of the elbow E. The wrist W is represented as $^0R_1{}^1R_2(q_1){}^2R_3(q_2)$ $^3R_4(q_3){}^4R_5(q_4){}^5P_W$ in the coordinate system of the shoulder S, where $^5P_W=[b, 0, 0]^T$ is the three-dimensional coordinate of the wrist W in the coordinate system of the fourth joint 34, and b is the length of the connecting rod of the fourth joint 34 and the wrist W in the arm.

S105: obtaining an angle of each joint in the robotic arm kinematics model according to the three-dimensional positional information of the key points of the human arm and the robotic arm kinematics model.

It can be known from the above-mentioned step S104 that the robotic arm kinematics model is a model which makes the human arm to be equivalent to a certain degrees of freedom, where one degree of freedom represents a joint in the arm.

The arm of the robot includes a first joint and a second joint as well as a third joint, a fourth joint, and a wrist portion sequentially connected through a connecting rod. The key points of the human arm include a shoulder point, an elbow point, and a wrist point. The step 105 of obtaining the angle of each joint in the robotic arm kinematics model according to the three-dimensional positional information of the key points of the human arm and the robotic arm kinematics model includes:

obtaining a vector from the shoulder point to the elbow point, a vector from the elbow point to the wrist point, and a vector from the shoulder point to the wrist point according to the three-dimensional positional information of the key points of the human arm;

obtaining an angle $q_1 = a\tan 2(\vec{r}_{SE}(0), \vec{r}_{SE}(1))$ of the first joint and an angle $$q_2 = \tan^{-1}\left(\vec{r}_{SE}(2) \Big/ \sqrt{\vec{r}_{SE}(0)^2 + \vec{r}_{SE}(1)^2}\right)$$

of the second joint according to the vector from the shoulder point to the elbow point, where $\vec{r}_{SE}(0)$ represents a component of $\vec{r}_{SE}$ in a vertical direction of a human body, $\vec{r}_{SE}(1)$ represents a component of $\vec{r}_{SE}$ in a perpendicular direction of the human body, $\vec{r}_{SE}(2)$ represents a component of $\vec{r}_{SE}$ in a horizontal direction of the human body, and $\vec{r}_{SE}$ represents a vector from the shoulder point to the elbow point;

obtaining an angle $$q_4 = \cos^{-1}\left(|\vec{r}_{SE}|^2 + |\vec{r}_{EW}|^2 - |\vec{r}_{SW}|^2 \big/ 2|\vec{r}_{SE}||\vec{r}_{EW}|\right)$$

fourth joint according to the vector from the shoulder point to the elbow point, the vector from the elbow point to the wrist point, and the vector from the shoulder point to the wrist point, where $\vec{R}_{EW}$ represents the vector from the elbow point to the wrist point and $\vec{R}_{SW}$ represents the vector from the shoulder point to the wrist point;

obtaining a first coordinate system transformation matrix of a coordinate system of the first joint with respect to a coordinate system of the shoulder portion of the arm;

obtaining a second coordinate system transformation matrix of a coordinate system of the second joint with respect to the coordinate system of the first joint according to the angle of the first joint and the robotic arm kinematics model;

obtaining a third coordinate system transformation matrix of a coordinate system of the third joint with respect to the coordinate system of the second joint according to the angle of the second joint and the robotic arm kinematics model;

obtaining a fifth coordinate system transformation matrix of a coordinate system of the wrist portion with respect to a coordinate system of the fourth joint according to the angle of the fourth joint and the robotic arm kinematics model;

obtaining a connecting rod length between the third joint and the fourth joint;

obtaining a three-dimensional coordinate of the fourth joint in the coordinate system of the third joint according to the connecting rod length between the third joint and the fourth joint;

obtaining a connecting rod length between the fourth joint and the wrist portion;

obtaining a three-dimensional coordinate of the wrist portion in the coordinate system of the fourth joint according to the connecting rod length between the fourth joint and the wrist portion; and obtaining an angle q3 of the third joint according to the robotic arm kinematics model, the vector from the shoulder point to the elbow point, the first coordinate system transformation matrix, the second coordinate system transformation matrix, the third coordinate system transformation matrix, the fifth coordinate system transformation matrix, the three-dimensional coordinate of the fourth joint in the coordinate system of the third joint, and the three-dimensional coordinate of the wrist portion in the coordinate system of the fourth joint, where:

$$\vec{r}_{SE} = {}^0R_1 {}^1R_2(q_1) {}^2R_3(q_2) {}^3P_E + {}^0R_1 {}^1R_2(q_1) {}^2R_3(q_2) {}^3R_4(q_3) {}^4R_5(q_4) {}^5P_W;$$

where, $^0R_1$ is the first coordinate system transformation matrix, $^1R_2(q_1)$ is the second coordinate system transformation matrix, $R_3(q_2)$ is the third joint coordinate system transformation matrix, $^3R_4(q_3)$ is a fourth joint coordinate system transformation matrix of the coordinate system of the fourth joint with respect to the coordinate system of the third joint, $^4R_4(q_3)$ is the fifth coordinate system transformation matrix; $^3P_E=[0, 0, a]^T$ is a three-dimensional coordinate of the fourth joint in the coordinate system of the third joint; and a is the connecting rod length between the third joint and the fourth joint, $^5P_1=[b, 0, 0]^T$ is the three-dimensional coordinate of the wrist portion in the coordinate system of the fourth joint, and b is the connecting rod length between the fourth joint and the wrist portion.

In which, the fourth coordinate system transformation matrix is obtained based on the angle of the third joint and the robotic arm kinematics model. In the process of obtaining the angle of each joint, the angle of the joint may refer to the amount of angular change with respect to an initial angle of the joint, where the initial angle of the joint can be the corresponding angle when the arm is vertically downward, for example, in the case that the arm is vertically downward, the initial angle of the first joint is recorded as 0°, and the initial angle of the second joint is 0, and because the arm is vertically downward, the connecting rod between the third joint and the fourth joint is parallel to the connecting rod between the fourth joint and the wrist joints, and the initial angle of the fourth joint is recorded as 0° or 180°. Since the angle of the third joint is the rotational angle with the connecting rod between the third joint and the fourth joint as the axis, any angle can be used as the initial angle of the third joint.

Figure 4:
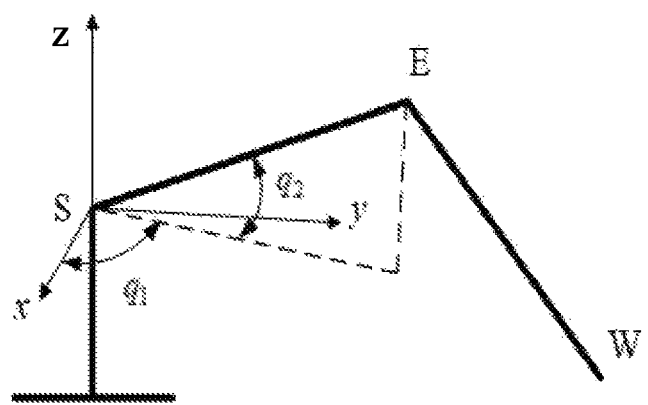
FIG. 4 is a schematic diagram of the solving of the angles of the first joint and the second joint according to the embodiment one of the present disclosure.

In which, based on the three-dimensional positional information of the key points of the human arm, for example, the three-dimensional positional information of the shoulder point, the elbow point, and the wrist point, a vector from the shoulder point to the elbow point, a vector from the elbow point to the wrist point, and a vector from the shoulder point to the wrist point can be obtained. FIG. 4 is a schematic diagram of the solving of the angles of the first joint and the second joint according to the embodiment one of the present disclosure. As shown in FIG. 4, the angles of the first joint, the second joint, and the fourth joint can be obtained according to the sine and cosine theorems. In the formula for calculating the angle q1 of the first joint, atan 2 is a function. In the C programming language, an azimuth is returned, the function prototype of atan 2 in the C programming language is "double atan 2 (double y, double x)", and the arctangent of y/x which is expressed in radians is returned.

In addition, according to the DH parameter table in the robotic arm kinematics model, the coordinate system transformation matrix between the joints can be obtained through DH kinematics modeling. In the formula for solving the angle q3 of the third joint, since $\vec{r}_{SE}$, $^0R_1$, $^1R_2(q_1)$, $^2R_3(q_2)$, $^4R_5(q_4)$, $^3P_{E1}=[0, 0, a]^T$, $^5P_W=[b, 0, 0]^T$, and the like are all known values, while only q3 in the coordinate system transformation matrix $^3R_4(q_3)$ is unknown value, q3 can be obtained. Particularly, in the above-mentioned process of solving the angle of each joint, the physical limitation of the human arm also needs to be considered.

In one embodiment, after the step 105 of obtaining the angle of each joint in the robotic arm kinematics model according to the three-dimensional positional information of the key points of the human arm and the robotic arm kinematics model further includes:

performing a smoothing process on the angle of each joint through a Kalman filter.

In which, after the angles of the four joints are obtained, the Kalman filter is used to smooth the angles of the four joints, respectively. The input value of the Kalman filter is the angles of the joints after solving, and the angles after smoothing are output. The smoothed angle is transmitted to the robot for motion tracking, which can ensure the stability of the motion of the arm.

Because the motion of the human body is disordered during the process of the robot mimicking the posture of the human body, in this embodiment, the prediction model of the Kalman filter is a linear model with a slope of 1:

$$\hat{x}_k = x_{k-1};$$

where, $\vec{x}_k$ is the predicted value at the current moment, and $x_{k-1}$ is the optimal estimated value at the previous moment.

S106: controlling an arm of the robot to perform a corresponding action according to the angle of each joint.

In which, the arm of the robot is installed with all the joints in the robotic arm kinematics model, and each joint performs a corresponding action under the control of a corresponding actuator, for example, in the case that a servo is provided at the joint, an output shaft of the servo is rotated to drive the arm connected to the joint to move (e.g., rotate) according to the angle of the joint. In which, the servo is driven by a motor, and the movement of the arm is realized by the motor to rotate the output shaft of the servo which is connected to the arm.

In this embodiment, the three-dimensional positional information of the key points of the human arm is obtained by recognizing the human posture image, and the angle of each joint in the robotic arm kinematics model is obtained using the robotic arm kinematics model, so as to control the arm of the robot to perform the corresponding action. It obtains the 3D positional information of the human posture image through technical means such as image recognition, and realizes the control of the arm of the robot based on the 3D positional information, without the need to use a 3D stereo camera to collect the 3D coordinates of the human body. As an example, an ordinary camera can be used to collect the human pose image, then the human pose image is processed to obtain the angles of the joints of the arm, and then the angles of the joints of the arm is controlled to perform the humanoid motion of the arm, which reduces the cost to a certain extent. At the same time, the ordinary camera is easy to install on the robot, so as to reduce the volume of the robot.

FIG. 5 is a schematic block diagram of a robot control apparatus according to the embodiment two of the present disclosure. A robot control apparatus 50 corresponding to the robot control method of the forgoing embodiment is provided. The robot control apparatus 50 may be applied to a robot as shown in FIG. 6. For convenience of explanation, only parts related to this embodiment are shown.

As shown in FIG. 5, the robot control apparatus 50 includes:

an image obtaining module 51 configured to obtain a human pose image;

a key point information obtaining module 52 configured to obtain pixel information of a plurality of preset key points in the human pose image;

a three-dimensional positional information obtaining module 53 configured to obtain three-dimensional positional information of key points of a human arm according to the pixel information of the plurality of preset key points, where the key points of the human arm are preset key points of an area at which the human arm in the human posture image locating;

a model obtaining module 54 configured to obtain a robotic arm kinematics model of a robot;

an angle obtaining module 55 configured to obtain an angle of each joint in the robotic arm kinematics model according to the three-dimensional positional information of the key points of the human arm and the robotic arm kinematics model; and a robotic arm control module 56 configured to control an arm of the robot to perform a corresponding action according to the angle of each joint.

In one embodiment, the robotic arm kinematics model is an arm model equivalent to a human arm with four degrees of freedom, where a shoulder portion of the arm has three degrees of freedom, and an elbow portion of the arm has one degree of freedom.

In one embodiment, the arm of the robot includes a first joint and a second joint as well as a third joint, a fourth joint and a wrist portion sequentially connected through a connecting rod. The key points of the human arm include a shoulder point, an elbow point, and a wrist point. In which, the angle obtaining module 55 is configured to:

obtain a vector from the shoulder point to the elbow point, a vector from the elbow point to the wrist point, and a vector from the shoulder point to the wrist point according to the three-dimensional positional information of the key points of the human arm;

obtain an angle $q_1 = a\tan 2(\vec{r}_{SE}(0), \vec{r}_{SE}(1))$ of the first joint and an angle $$q_2 = \tan^{-1}\left(\vec{r}_{SE}(2) / \sqrt{\vec{r}_{SE}(0)^2 + \vec{r}_{SE}(1)^2}\right)$$

of the second joint according to the vector from the shoulder point to the elbow point, where $\vec{r}_{SE}(0)$ represents a component of $\vec{r}_{SE}$ in a vertical direction of a human body, $\vec{r}_{SE}(1)$ represents a component of $\vec{r}_{SE}$ in a perpendicular direction of the human body, $\vec{r}_{SE}(2)$ represents a component of $\vec{r}_{SE}$ in a horizontal direction of the human body, and $\vec{r}_{SE}$ represents a vector from the shoulder point to the elbow point;

obtain an angle $$q_4 = \cos^{-1}\left(\left(|\vec{r}_{SE}|^2 + |\vec{r}_{EW}|^2 - |\vec{r}_{SW}|^2\right) / 2|\vec{r}_{SE}||\vec{r}_{EW}|\right)$$

fourth joint according to the vector from the shoulder point to the elbow point, the vector from the elbow point to the wrist point, and the vector from the shoulder point to the wrist point, where $\vec{r}_{EW}$ represents the vector from the elbow point to the wrist point and $\vec{r}_{SW}$ represents the vector from the shoulder point to the wrist point;

obtain a first coordinate system transformation matrix of a coordinate system of the first joint with respect to a coordinate system of the shoulder portion of the arm;

obtain a second coordinate system transformation matrix of a coordinate system of the second joint with respect to the coordinate system of the first joint according to the angle of the first joint and the robotic arm kinematics model;

obtain a third coordinate system transformation matrix of a coordinate system of the third joint with respect to the coordinate system of the second joint according to the angle of the second joint and the robotic arm kinematics model;

obtain a fifth coordinate system transformation matrix of a coordinate system of the wrist portion with respect to a coordinate system of the fourth joint according to the angle of the fourth joint and the robotic arm kinematics model;

obtain a connecting rod length between the third joint and the fourth joint;

obtain a three-dimensional coordinate of the fourth joint in the coordinate system of the third joint according to the connecting rod length between the third joint and the fourth joint;

obtain a connecting rod length between the fourth joint and the wrist portion;

obtain a three-dimensional coordinate of the wrist portion in the coordinate system of the fourth joint according to the connecting rod length between the fourth joint and the wrist portion; and obtain an angle q3 of the third joint according to the robotic arm kinematics model, the vector from the shoulder point to the elbow point, the first coordinate system transformation matrix, the second coordinate system transformation matrix, the third coordinate system transformation matrix, the fifth coordinate system transformation matrix, the three-dimensional coordinate of the fourth joint in the coordinate system of the third joint, and the three-dimensional coordinate of the wrist portion in the coordinate system of the fourth joint, where:

$$\vec{r}_{SE} = E^0 R_1{}^1 R_2(q_1)^2 R_3(q_2)^3 P_E + {}^0 R_1{}^1 R_2(q_1)^2 R_3(q_2)^3 R_4(q_3)^4 R_5(q_4)^5 P_W;$$

where, $^0R_1$ is the first coordinate system transformation matrix, $^1R_2(q_1)$ is the second coordinate system transformation matrix, $R_3(q_2)$ is the third joint coordinate system transformation matrix, $^3R_4(q_3)$ is a fourth joint coordinate system transformation matrix of the coordinate system of the fourth joint with respect to the coordinate system of the third joint, $^4R_5(q_4)$ is the fifth coordinate system transformation matrix; $^3P_E = [0, 0, a]^T$ is a three-dimensional coordinate of the fourth joint in the coordinate system of the third joint; and a is the connecting rod length between the third joint and the fourth joint, $^5P_W = [b, 0, 0]^T$ is the three-dimensional coordinate of the wrist portion $^5P_W$ in the coordinate system of the fourth joint, and b is the connecting rod length between the fourth joint and the wrist portion.

In one embodiment, the key point information obtaining module 52 is configured to input the human pose image to a light weight open pose detection model to obtain the pixel information of the plurality of preset key points in the human pose image.

In one embodiment, the three-dimensional positional information obtaining module 53 is configured to input the pixel information of the plurality of preset key points to a convolutional neural network model to obtain the three-dimensional positional information of the key points of the human arm.

In one embodiment, the robot control apparatus further includes:

a denoising processing module configured to perform a denoising process on the three-dimensional positional information of the key points of the human arm through a first-order low-pass filter.

In one embodiment, the robot control apparatus further includes:

a smoothing module configured to perform a smoothing process on the angle of each joint through a Kalman filter.

It should be noted that, the information interaction between the above-mentioned modules, the execution process, and the like are based on the same concept as the method embodiments of the present disclosure, and their functions and technical effects can refer to the method embodiments, which are not described herein.

In this embodiment, each of the above-mentioned modules/units is implemented in the form of software, which can be computer program(s) stored in a memory of the robot control apparatus 50 and executable on a processor of the robot control apparatus 50. In other embodiments, each of the above-mentioned modules/units may be implemented in the form of hardware (e.g., a circuit of the robot control apparatus 50 which is coupled to the processor of the robot control apparatus 50) or a combination of hardware and software (e.g., a circuit with a single chip microcomputer).

FIG. 6 is a schematic block diagram of a robot according to the embodiment three of the present disclosure. In this embodiment, a robot control method for a robot 6 is provided. The robot 6 is a humanoid robot having a left arm and a right arm. As shown in FIG. 6, the robot 6 includes at least one processor 60 (only one is shown in FIG. 6), a storage 61, a computer program 62 stored in the storage 61 and executable on the at least one processor 60, and a camera 63. The processor 60 executes the computer program 62 to implement the steps in any of the foregoing embodiments of the robot control method.

The robot 6 may include, but is not limited to, the processor 60 and the storage 61. It can be understood by those skilled in the art that FIG. 6 is merely an example of the robot 6 and does not constitute a limitation on the robot 6, and may include more or fewer components than those shown in the figure, or a combination of some components or different components. For example, the robot 6 may further include an input/output device, a network access device, and the like; or include components that need to be set in a robot entity, for example, an RGB camera and an robotic arm.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

In some embodiments, the storage 61 may be an internal storage unit of the robot 6, for example, a hard disk or a memory of the robot 6. In other embodiments, the storage 61 may also be an external storage device of the robot 6, for example, a plug-in hard disk, a smart media card (SMC), a secure digital (SD) card, flash card, and the like, which is equipped on the robot 6. Furthermore, the storage 61 may further include both an internal storage unit and an external storage device, of the robot 6. The storage 61 is configured to store an operating system, application programs, a boot loader, data, and other programs, for example, a program code of the computer program 62. The storage 61 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned apparatus, reference may be made to the corresponding processes in the above-mentioned method embodiments, and are not described herein. When the integrated unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include at least any primitive or device capable of carrying the computer program codes, a recording medium, a computer memory, a read-only memory (ROM), a random access memory (RAM), electric carrier signals, telecommunication signals and software distribution media, for example, a USB flash drive, a portable hard disk, a magnetic disk, an optical disk, and the like. In some jurisdictions, according to the legislation and patent practice, a computer readable medium does not include electric carrier signals and telecommunication signals.

All or part of the processes in the methods for implementing the above-mentioned embodiments of the present disclosure may also be realized through a computer program product. When the computer program product is executed on a robot, the robot can implement the steps in the above-mentioned method embodiment when the robot works.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (or device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented control method for a robot, comprising executing on a processor steps of:
   obtaining a human pose image;
   obtaining pixel information of a plurality of preset key points in the human pose image;
   obtaining three-dimensional positional information of key points of a human arm according to the pixel information of the plurality of preset key points, wherein the key points of the human arm are preset key points of an area at which the human arm in the human pose image is located;
   obtaining a robotic arm kinematics model of a robot;
   obtaining an angle of each joint in the robotic arm kinematics model according to the three-dimensional positional information of the key points of the human arm and the robotic arm kinematics model; and
   controlling an arm of the robot to perform a corresponding action according to the angle of each joint;
   wherein the arm of the robot comprises a first joint, a second joint, and a third joint, a fourth joint and a wrist portion sequentially connected through a connecting rod, the key points of the human arm comprise a shoulder point, an elbow point, and a wrist point;
   wherein the step of obtaining the angle of each joint in the robotic arm kinematics model according to the three-dimensional positional information of the key points of the human arm and the robotic arm kinematics model comprises:
   obtaining a vector from the shoulder point to the elbow point, a vector from the elbow point to the wrist point, and a vector from the shoulder point to the wrist point according to the three-dimensional positional information of the key points of the human arm;
   obtaining an angle $q_1 = a\tan2(\vec{r}_{SE}(0), \vec{r}_{SE}(1))$ of the first joint and an angle $$q_2 = \tan^{-1}\left(\vec{r}_{SE}(2) \Big/ \sqrt{\vec{r}_{SE}(0)^2 + \vec{r}_{SE}(1)^2}\right)$$

of the second joint according to the vector from the shoulder point to the elbow point, wherein $\vec{r}_{SE}(0)$ represents a component of $\vec{r}_{SE}$ in a vertical direction of a human body, $\vec{r}_{SE}(1)$ represents a component of $\vec{r}_{SE}$ in a perpendicular direction of the human body, $\vec{r}_{SE}(2)$ represents a component of $\vec{r}_{SE}$ in a horizontal direction of the human body, and $\vec{r}_{SE}$ represents a vector from the shoulder point to the elbow point;
   obtaining an angle $$q_4 = \cos^{-1}\left(|\vec{r}_{SE}|^2 + |\vec{r}_{EW}|^2 - |\vec{r}_{SW}|^2 \Big/ 2|\vec{r}_{SE}||\vec{r}_{EW}|\right)$$

of the fourth joint according to the vector from the shoulder point to the elbow point, the vector from the elbow point to the wrist point, and the vector from the shoulder point to the wrist point, wherein $\vec{r}_{EW}$ represents the vector from the elbow point to the wrist point and $\vec{r}_{SW}$ represents the vector from the shoulder point to the wrist point;
   obtaining a first coordinate system transformation matrix of a coordinate system of the first joint with respect to a coordinate system of a shoulder portion of the arm of the robot;
   obtaining a second coordinate system transformation matrix of a coordinate system of the second joint with respect to the coordinate system of the first joint according to the angle of the first joint and the robotic arm kinematics model;
   obtaining a third coordinate system transformation matrix of a coordinate system of the third joint with respect to the coordinate system of the second Joint according to the angle of the second joint and the robotic arm kinematics model;
   obtaining a fifth coordinate system transformation matrix of a coordinate system of the wrist portion with respect to a coordinate system of the fourth joint according to the angle of the fourth joint and the robotic arm kinematics model;
   obtaining a connecting rod length between the third joint and the fourth joint;
   obtaining a three-dimensional coordinate of the fourth joint in the coordinate system of the third joint according to the connecting rod length between the third joint and the fourth joint;
   obtaining a connecting rod length between the fourth joint and the wrist portion;
   obtaining a three-dimensional coordinate of the wrist portion in the coordinate system of the fourth joint according to the connecting rod length between the fourth joint and the wrist portion; and obtaining an angle q3 of the third joint according to the robotic arm kinematics model, the vector from the shoulder point to the elbow point, the first coordinate system transformation matrix, the second coordinate system transformation matrix, the third coordinate system transformation matrix, the fifth coordinate system transformation matrix, the three-dimensional coordinate of the fourth joint in the coordinate system of the third joint, and the three-dimensional coordinate of the wrist portion in the coordinate system of the fourth joint, wherein:

$$\vec{r}_{SE}=^{0}R_{1}{}^{1}R_{2}(q_{1})^{2}R_{3}(q_{2})^{3}P_{E}+^{0}R_{1}{}^{1}R_{2}(q_{1})^{2}R_{3}(q_{2})^{3}R_{4}(q_{3})^{4}R_{5}(q_{4})^{5}P_{W};$$

where, $^{0}R_{1}$ is the first coordinate system transformation matrix, $^{1}R_{2}(q_{1})$ is the second coordinate system transformation matrix, $R_{3}(q_{2})$ is the third joint coordinate system transformation matrix, $^{3}R_{4}(q_{3})$ is a fourth Joint coordinate system transformation matrix of the coordinate system of the fourth joint with respect to the coordinate system of the third joint, $^{4}R_{5}(q_{4})$ is a fifth coordinate system transformation matrix; $^{3}P_{E}=[0,0,a]^{T}$ is a three dimensional dimensional coordinate of the fourth joint in the coordinate system of the third joint, and a is the connecting rod length between the third joint and the fourth joint, $^{5}P_{W}=[b, 0,0]^{T}$ is the three-dimensional coordinate of the wrist portion in the coordinate system of the fourth joint, and b is the connecting rod length between the fourth joint and the wrist portion.

2. The method of claim 1, wherein the robotic arm kinematics model is an arm model equivalent to a human arm with four degrees of freedom, where the shoulder portion of the arm of the robot has three degrees of freedom, and an elbow portion of the arm of the robot has one degree of freedom.

3. The method of claim 1, wherein the step of obtaining the pixel information of the plurality of preset key points in the human pose image comprises:
inputting the human pose image to a light weight open pose detection model to obtain the pixel information of the plurality of preset key points in the human pose image.

4. The method of claim 1, wherein the step of obtaining the three-dimensional positional information of the key points of the human arm according to the pixel information of the plurality of preset key points comprises:
inputting the pixel information of the plurality of preset key points to a convolutional neural network model to obtain the three-dimensional positional information of the key points of the human arm.

5. The method of claim 1, wherein after the step of obtaining the three-dimensional positional information of the key points of the human arm according to the pixel information of the plurality of preset key points comprises:
performing a denoising process on the three-dimensional positional information of the key points of the human arm through a first-order low-pass filter.

6. The method of claim 1, wherein after the step of obtaining the angle of each joint in the robotic arm kinematics model according to the three-dimensional positional information of the key points of the human arm and the robotic arm kinematics model further comprises:
performing a smoothing process on the angle of each joint through a Kalman filter.

7. The method of claim 1, wherein the step of obtaining the human pose image comprises:
obtaining the human pose image through a camera.

8. The method of claim 1, wherein the arm of the robot comprises one or more joints, the step of controlling the arm of the robot to perform the corresponding action according to the angle of each joint comprises:
controlling the arm of the robot to move by rotating an output shaft of a servo of each joint of the arm of the robot according to the angle of each joint in the robotic arm kinematics.

9. A control apparatus for a robot, comprising:
a memory; and
a processor;
wherein the memory stores computer programs, which when executed by the processor, cause the processor to;
obtain a human pose image;
obtain pixel information of a plurality of preset key points in the human pose image;
obtain three-dimensional positional information of key points of a human arm according to the pixel information of the plurality of preset key points, wherein the key points of the human arm are preset key points of an area at which the human pose image is located,
obtain a robotic arm kinematics model of a robot,
obtain an angle of each joint in the robotic arm kinematics model according to the three-dimensional positional information of the key points of the human arm and the robotic arm kinematics model; and
control module configured to control awl arm of the robot to perform a corresponding action according to the angle of each joint;
wherein the arm of the robot comprises a first joint, a second joint and a third joint a fourth joint and a wrist portion sequentially connected through a connecting rod, the key points of the human arm comprise a shoulder point, an elbow point, and a wrist point, and
the computer programs further cause the processor to;
obtain a vector from the shoulder point to the elbow point, a vector from the elbow point to the wrist point, and a vector from the shoulder point to the wrist point according to the three dimensional positional information of the key points of the human arm,
obtain an angle of the first joint and an angle of the second joint according to the vector from the shoulder point to the elbow point,
obtain an angle of the fourth joint according to the vector from the shoulder point to the elbow point, the vector from the elbow point to the wrist point, and the vector from the shoulder point to the wrist point;
obtain a first coordinate system transformation matrix of a coordinate system of the first joint with respect to a coordinate system of a shoulder portion of the arm of the robot, a second coordinate system transformation matrix of a coordinate system of the second joint with respect to the coordinates system of the first point a third coordinate system transformation matrix of a coordinate system of the third joint with respect to the coordinate system of the second joint, a fifth coordinate system transformation matrix of a coordinate system of the wrist portion with respect to a coordinate system of the fourth joint, according to the angle of the first joint, the angle of the second joint, the angle of the fourth joint and the robotic arm kinematics model;
obtain a three-dimensional coordinate of the fourth joint in the coordinate system of the third joint, and a three-dimensional coordinate of the wrist portion in the coordinate system of the fourth joint, according to a connecting rod length between the third joint and the fourth joint, and a connecting rod length between the fourth joint and the wrist portion; and obtain an angle of the third joint according to the robotic arm kinematics model, the vector from the shoulder point to the elbow point, the first coordinate system transformation matrix, the second coordinate system transformation matrix, the third coordinate system transformation matrix, the fifth coordinate system transformation matrix, the three-dimensional coordinate of the fourth joint in the coordinate system of the third joint, and the three-dimensional coordinate of the wrist portion in the coordinate system of the fourth joint.

10. The apparatus of claim 9, wherein the computer programs further cause the processor to:

obtain the angle $q_1 = a\tan 2(\vec{r}_{SE}(0), \vec{r}_{SE}(1))$ of the first joint and the angle $$q_2 = \tan^{-1}\left(\vec{r}_{SE}(2) / \sqrt{\vec{r}_{SE}(0)^2 + \vec{r}_{SE}(1)^2}\right)$$

of the second joint according to the vector from the shoulder point to the elbow point, wherein $\vec{r}_{SE}(0)$ represents a component of $\vec{r}_{SE}$ in a vertical direction of a human body, $\vec{r}_{SE}(2)$ represents a component of $\vec{r}_{SE}$ in a perpendicular direction of the human body, $\vec{r}_{SE}(2)$ represents a component of $\vec{r}_{SE}$ in a horizontal direction of the human body, and $\vec{r}_{SE}$ represents a vector from the shoulder point to the elbow point;

obtain the angle $$q_4 = \cos^{-1}\left(|\vec{r}_{SE}|^2 + |\vec{r}_{EW}|^2 - |\vec{r}_{SW}|^2 / 2|\vec{r}_{SE}||\vec{r}_{EW}|\right)$$

of the fourth joint according to the vector from the shoulder point to the elbow point, the vector from the elbow point to the wrist point, and the vector from the shoulder point to the wrist point, wherein $\vec{r}_{EW}$ represents the vector from the elbow point to the wrist point and $\vec{r}_{SW}$ represents the vector from the shoulder point to the wrist point;

obtain the first coordinate system transformation matrix of the coordinate system of the first joint with respect to the coordinate system of the shoulder portion of the arm of the robot;

obtain the second coordinate system transformation matrix of the coordinate system of the second joint with respect to the coordinate system of the first joint according to the angle of the first joint and the robotic arm kinematics model;

obtain the third coordinate system transformation matrix of the coordinate system of the third joint with respect to the coordinate system of the second joint according to the angle of the second joint and the robotic arm kinematics model;

obtain the fifth coordinate system transformation matrix of Han the coordinate system of the wrist portion with respect to the coordinate system of the fourth joint according to the angle of the fourth joint and the robotic arm kinematics model;

obtain the connecting rod length between the third joint and the fourth joint;

obtain the three-dimensional coordinate of the fourth joint in the coordinate system of the third joint according to the connecting rod length between the third joint and the fourth joint;

obtain the connecting rod length between the fourth joint and the wrist portion;

obtain the three-dimensional coordinate of the wrist portion in the coordinate system of the fourth joint according to the connecting rod length between the fourth joint and the wrist portion; and obtain the angle q3 of the third joint according to the robotic arm kinematics model, the vector from the shoulder point to the elbow point, the first coordinate system transformation matrix, the second coordinate system transformation matrix, the third coordinate system transformation matrix, the fifth coordinate system transformation matrix, the three-dimensional coordinate of the fourth joint in the coordinate system of the third joint, and the three-dimensional coordinate of the wrist portion in the coordinate system of the fourth joint, wherein:

$$\vec{r}_{SE} = {}^0R_1{}^1R_2(q_1){}^2R_3(q_2){}^3P_E + {}^0R_1{}^1R_2(q_1){}^2R_3(q_2){}^3R_4(q_3){}^4R_5(q_4){}^5P_W;$$

where, ${}^0R_1$ is the first coordinate system transformation matrix, ${}^1R_2(q_1)$ is the second coordinate system transformation matrix, $R_3(q_2)$ is the third joint coordinate system transformation matrix, ${}^3R_4(q_3)$ is a fourth joint coordinate system transformation matrix of the coordinate system of the fourth joint with respect to the coordinate system of the third joint, ${}^4R_5(q_4)$ is the fifth coordinate system transformation matrix; ${}^3P_E = [0,0,a]^T$ is a three-dimensional coordinate of the fourth joint in the coordinate system of the third joint; and a is the connecting rod length between the third joint and the fourth joint, ${}^5P_W = [b, 0, 0]^T$ is the three-dimensional coordinate of the wrist portion in the coordinate system of the fourth joint, and b is the connecting rod length between the fourth joint and the wrist portion.

11. The apparatus of claim 9, wherein the computer programs further cause the processor to:

input the human pose image to a light weight open pose detection model to obtain the pixel information of the plurality of preset key points in the human pose image.

12. The apparatus of claim 9, wherein the computer programs further cause the processor to:

input the pixel information of the plurality of preset key points to a convolutional neural network model to obtain the three-dimensional positional information of the key points of the human arm.

13. A biped robot comprising:

a memory; and a processor;

wherein the memory stores a computer program executable on the processor, and the computer program comprises;

instructions for obtaining a human pose image;

instructions for obtaining pixel information of a plurality of preset key points in the human pose image;

instructions for obtaining three-dimensional positional information of key points of a human arm according to the pixel information of the plurality of preset key points, wherein the key points of the human arm are preset key points of an area at which the human arm in the human pose image is located;

instructions for obtaining a robotic arm kinematics model of a robot;

instructions for obtaining an angle of each joint in the robotic arm kinematics model according to the three-dimensional positional information of the key points of the human arm and the robotic arm kinematics model; and instructions for controlling an arm of the robot to perform a corresponding action according to the angle of each joint;

wherein the arm of the robot comprises a first joint, a second joint, and a third joint, a fourth joint and a wrist portion sequentially connected through a connecting rod, the key points of the human arm comprise a shoulder point, an elbow point, and a wrist point;

wherein the instructions for obtaining the angle of each joint in the robotic arm kinematics model according to the three-dimensional positional information of the key points of the human arm and the robotic arm kinematics model comprise;

instructions for obtaining a vector from the shoulder point to the elbow point, a vector from the elbow point to the wrist point, and a vector from the shoulder point to the wrist point according to the three-dimensional positional information of the key points of the human arm;

instructions for obtaining an angle $q_1 = a\tan 2(\vec{r}_{SE}(0), \vec{r}_{SE}(1))$ of the first point and an angle $$q_2 = \tan^{-1}\left(\vec{r}_{SE}(2) / \sqrt{\vec{r}_{SE}(0)^2 + \vec{r}_{SE}(1)^2}\right)$$

of the second joint according to the vector from the shoulder point to the elbow point, wherein $\vec{r}_{SE}(0)$ represents a component of $\vec{r}_{SE}$ in a vertical direction of a human body, $\vec{r}_{SE}(1)$ represents a component of $\vec{r}_{SE}$ in a perpendicular direction of the human body, $\vec{r}_{SE}(2)$ represents a component of $\vec{r}_{SE}$ in a horizontal direction of the human body, and $\vec{r}_{SE}$ represents a vector from the shoulder point to the elbow point;

instructions for obtaining an angle $$q_4 = \cos^{-1}\left(|\vec{r}_{SE}|^2 + |\vec{r}_{EW}|^2 - |\vec{r}_{SW}|^2 / 2|\vec{r}_{SE}||\vec{r}_{EW}|\right)$$

of the fourth joint according to the vector from the shoulder point to the elbow point, the vector from the elbow point to the wrist point, and the vector from the shoulder point to the wrist point, wherein $\vec{r}_{EW}$ represents the vector from the elbow point to the wrist point and $\vec{r}_{SW}$ represents the vector from the shoulder point, to the wrist point;

instructions for obtaining a first coordinate system transformation matrix of a coordinate system of the first joint with respect to a coordinate system of a shoulder portion of the arm of the robot;

instructions for obtaining a second coordinate system transformation matrix of a coordinate system of the second joint with respect to the coordinate system of the first joint according to the angle of the first joint and the robotic arm kinematics model;

instructions for obtaining a third coordinate system transformation matrix of a coordinate system of the third joint with respect to the coordinate system of the second joint according to the angle of the second joint and the robotic arm kinematics model;

instructions for obtaining a fifth coordinate system transformation matrix of a coordinate system of the wrist portion with respect to a coordinate system of the fourth joint according to the angle of the fourth joint and the robotic arm kinematics model;

instructions for obtaining a connecting rod length between the third joint and the fourth joint;

instructions for obtaining a three-dimensional coordinate of the fourth joint in the coordinate system of the third joint according to the connecting rod length between the third joint and the fourth joint;

instructions for obtaining a connecting rod length between the fourth joint and the wrist portion;

instructions for obtaining a three-dimensional coordinate of the wrist portion in the coordinate system of the fourth joint according to the connecting rod length between the fourth joint and the wrist portion; and instructions for obtaining an angle q3 of the third joint according to the robotic arm kinematics model, the vector from the shoulder point to the elbow point, the first coordinate system transformation matrix the second coordinate system transformation matrix the third coordinate system transformation matrix, the fifth coordinate system transformation matrix, the three-dimensional coordinate of the fourth joint in the coordinate system of the third joint, and the three-dimensional coordinate of the wrist portion in the coordinate system of the fourth joint, wherein:

$\vec{r}_{SE} = {}^0R_1{}^1R_2(q_1){}^2R_3(q_2){}^3P_E + {}^0R_1{}^1R_2(q_1){}^2R_3(q_2){}^3R_4(q_3){}^4R_5(q_4){}^5P_W$;

where, ${}^0R_1$ is the first coordinate system transformation matrix, ${}^1R_2(q_1)$ is the second coordinate system transformation matrix, $R_3(q_2)$ is the third joint coordinate system transformation matrix, ${}^3R_4(q_3)$ is a fourth joint coordinate system transformation matrix of the coordinate system of the fourth joint with respect to the coordinate system of the third joint, ${}^4R_5(q_4)$ is the fifth coordinate system transformation matrix; ${}^3P_E = [0, 0, a]^T$ is a three-dimensional coordinate of the fourth joint icy the coordinate system of the third joint; and a is the connecting rod length between the third joint and the fourth joint, ${}^5P_W = [b, 0, 0]^T$ is the three-dimensional coordinate of the wrist portion in the coordinate system of the fourth joint, and b is the connecting rod length between the fourth joint and the wrist portion.

14. The robot of claim 13, wherein the robotic arm kinematics model is an arm model equivalent to a human arm with four degrees of freedom, where the shoulder portion of the arm of the robot has three degrees of freedom, and an elbow portion of the arm of the robot has one degree of freedom.

15. The robot of claim 13, wherein the instructions for obtaining the pixel information of the plurality of preset key points in the human pose image comprise;

instructions for inputting the human pose image to a light weight open pose detection model to obtain the pixel information of the plurality of preset key points in the human pose image.

16. The robot of claim 13, wherein the instructions for obtaining the three-dimensional positional information of the key points of the human arm according to the pixel information of the plurality of preset key points comprise;

instructions for inputting the pixel information of the plurality of preset key points to a convolutional neural network model to obtain the three-dimensional positional information of the key points of the human arm.

17. The robot of claim 13, wherein the computer program further comprises:
  instructions for performing a denoising process on the three-dimensional positional information of the key points of the human arm through a first-order low-pass filter.

18. The robot of claim 13, wherein the computer program further comprises:
  instructions for performing a smoothing process on the angle of each joint through a Kalman filter.

19. The robot of claim 13, wherein the instructions for obtaining the human pose image comprise:
  instructions for obtaining the human pose image through a camera.

20. The robot of claim 13, wherein the arm of the robot comprises one or more joints, the instructions for controlling the arm of the robot to perform the corresponding action according to the angle of each joint comprise:
  instructions for controlling the arm of the robot to move by rotating an output shaft of a servo of each joint of the arm of the robot according to the angle of each joint in the robotic arm kinematics.

* * * * *